United States Patent [19]
Croissant et al.

[11] 3,969,147
[45] July 13, 1976

[54] GELLED ALKALINE ELECTROLYTE

[75] Inventors: Pierre Croissant, Smarves; Rolande Coudrin, Antogny-le-Tillac, both of France

[73] Assignee: SAFT-Societe des Accumulateurs Fixes et de Traction, Romainville, France

[22] Filed: July 25, 1974

[21] Appl. No.: 491,751

Related U.S. Application Data

[63] Continuation of Ser. No. 268,016, June 30, 1972, abandoned.

[30] Foreign Application Priority Data

June 30, 1971 France .............................. 71.24030

[52] U.S. Cl. ............................................. 136/157
[51] Int. Cl.² ..................... H01M 6/06; H01M 6/22
[58] Field of Search .......................... 136/157, 86 A

[56] References Cited
UNITED STATES PATENTS

| | | | |
|---|---|---|---|
| 2,748,183 | 5/1956 | Morehouse .......................... | 136/157 |
| 3,265,632 | 8/1966 | Leach .................................. | 136/157 |
| 3,697,327 | 10/1972 | Croissant et al. .................... | 136/157 |
| 3,840,406 | 10/1974 | Depoix .............................. | 136/86 A |

*Primary Examiner*—John H. Mack
*Assistant Examiner*—H. A. Feeley
*Attorney, Agent, or Firm*—Kenyon & Kenyon Reilly Carr & Chapin

[57] ABSTRACT

Gelled electrolyte for electrochemical generators, of the type comprising an alkaline solution to which is added a gelling agent. The said agent comprises modified or reticulated starches. The gelled state of these electrolytes is maintained, whatever the concentration of the alkaline solutions used may be.

13 Claims, 1 Drawing Figure

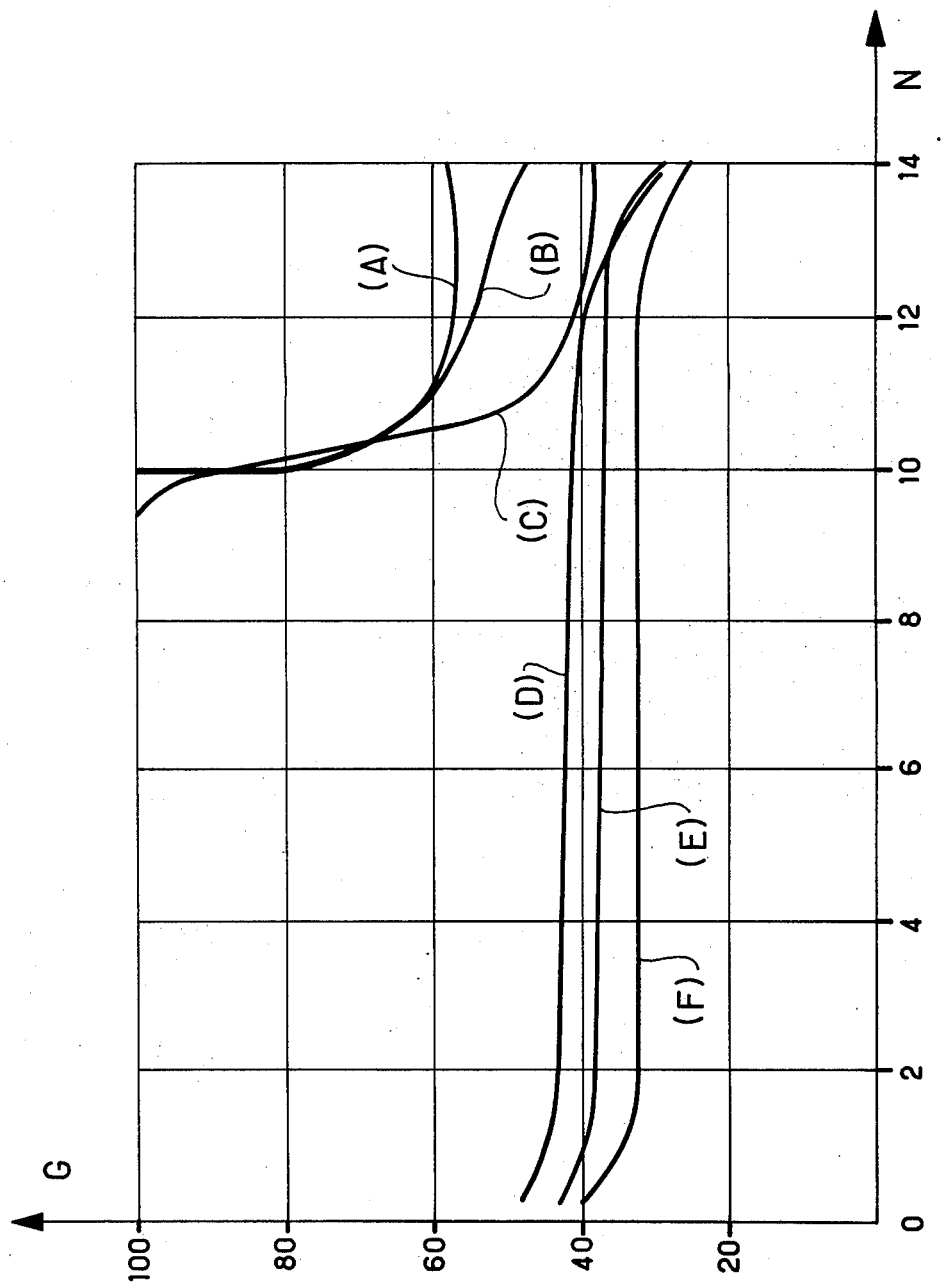

GELLED ALKALINE ELECTROLYTE

This is a continuation of application Ser. No. 268,016 filed June 30, 1972, now abandoned.

RELATED APPLICATIONS

A related application entitled Alkaline Cell with Gelled Electrolyte bearing Ser. No. 268,016 is copending.

BRIEF SUMMARY OF INVENTION

The invention relates to gelled electrolytes intended for use in electrochemical generators and being of the type comprising an alkaline solution to which a gelling agent has been added. Generators of this type may be, for example, those described in the above-mentioned related application.

It is already known in the art to use as a gelling agent in such electrolytes native starches such as, for instance, potato, corn, rice, grain and similar starches.

However, it was found that these native starches exhibit a satisfactory behavior only in the case of high alkali concentrations. For that reason, with a potassium hydroxide solution, in order that the gel retain its qualities and not liquefy, it is necessary to use hydroxide concentration having a normality in excess of 11N. In the case of lower concentrations, the starch grains burst and can then no longer retain the desired gelled state of the electrolytes.

However, such high potassium hydroxide concentrations in the electrolyte cannot be used at low temperatures and exhibit, besides, a less favorable conductance than more dilute hydroxide solutions.

Moreover, the electrochemical reactions in a cell occurring in particular on the negative electrode may result in the formation of water, thereby effecting a dilution of the electrolyte that may cause, at least locally, the bursting of the starch grains.

The result is a destruction of or partial liquefaction at least of the gel that may translate itself into leakage of electrolyte from the cell.

The instant invention makes it possible in particular to remedy these drawbacks.

It has among its objects and features the provision of a gelled electrolyte intended for electrochemical generators and being of the type comprising an alkaline solution, e.g. an alkali hydroxide solution to which a gelling agent has been added, characterized by the fact that the said agent comprises primarily modified or reticulated starches.

Such modified or reticulated starches, which are starches processed in known manner with certain reagents, such as epichlorohydrine have a far greater resistance than the native starches to the effect of alkaline solutions, irrespective of the concentration of such solutions. Examples of such starches are described in the U.S. Pat. No. 2,748,183.

With the modified or reticulated starches, it is possible to use potassium hydroxide solutions having a normality less than 11N without occurrence of liquefaction of the gels.

Gelled electrolytes embodying the invention are useful, for example, in electrochemical generators of the type disclosed in the above-noted related application. Such cell is depolarized by oxygen. Its positive electrode is supplied suitably with oxygen. Its negative electrode comprises gelled electrolyte containing powdered zinc as negative active material. Gelled electrolyte separates the positive and negative electrodes.

Other objects, features and characteristics of the invention will become apparent from the following detailed description and the accompanying drawing.

The single FIGURE of the drawing depicts swelling curves of different starches in aqueous potassium hydroxide solutions of differing concentrations. In this FIGURE, the normality, N, of the potassium hydroxide solutions constitutes the abscissa and the swelling, G, of the starch grains (expressed as a percentage) constitutes the ordinate.

DETAILED DESCRIPTION

Referring to the drawing, the curves (A), (B) and (C) relate respectively to the results obtained using potassium hydroxide solutions of differing normality respectively with native corn starch, native potato starch and native wheat flour, as gelling agents.

It can be seen clearly from these curves (A), (B) and (C) that as soon as the normality of the potassium hydroxide solution reaches a value substantially below 11N, a very pronounced swelling of the starch grains is notable. This translates itself in practice into a liquefaction of the resultant gel.

The curves (D), (E) and (F) relate respectively to the results obtained using potassium hydroxide solutions of differing normality with reticulated starches as swelling agents which have undergone a more or less significant reticulation treatment.

As known in the art, the processing index of the treated starches is determined by the following test:

5 grams of treated starches with 100 cc of water are boiled for 20 minutes. The processing index is determined in accordance with the volume of starch settled or deposited thereafter within a period of 24 hours.

The curve (D) is a plot of results with reticulated potato starch having a processing index of 47.

Curve (E) is a similar plot with reticulated potato starch having a processing index of 35.

Curve (F) is a similar plot with reticulated potato starch having a processing index of 28.

The swelling measurements for each of these starches are performed according to the following procedure:

The starch is maintained in suspension in a potassium hydroxide solution of specified normality in question at the rate of 5 grams per 100 cc of such solution at 20°C. for 2 hours. 10 cc of the resulting suspension are then subjected to centrifugation. The swelling of the starch is the volume occupied by it expressed in 1/10 of cc.

Similar procedure is followed with like quantities of such starches in suspension in like quantities of potassium hydroxide solutions of different normalities. The swelling results with potassium hydroxide solutions of different normalities are plotted in the single FIGURE of the drawing producing respective curves D, E and F. As can be seen from these curves, the reticulated starches each exhibit practically constant swelling irrespective of the normality of the potassium hydroxide solutions.

It seems that a processing index of the reticulated starches to be used lying between 25 and 50 is most appropriate because, if the index is below 25, the gelling properties of the starches becomes inadequate, and if, the index is in excess of 50 a resulting risk arises of obtaining a degradation with time of the gel.

The amount of reticulated starches used per liter of the alkaline solution e.g. potassium hydroxide in providing the gelled electrolyte may vary greatly and depends in particular on the desired fluidity of the gelled electrolyte.

Thus, if a concentration of reticulated starches between 150 and 240 grams/liter is used, a gelled electrolyte results having a definite degree of mobility that is suitable in particular for use of air depolarization cells of the type hereinabove mentioned.

The gelled electrolyte in accordance with the invention can be advantageously and preferably used in electrochemical generators which have a zinc base negative electrode.

The zinc discharge reactions in such generator are:

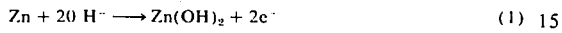

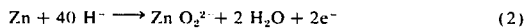

Reaction (1) occurs when the zinc hydroxide does not dissolve in the electrolyte, that is to say, when the latter is saturated with zincate, whereas reaction (2) occurs in the contrary case.

It can be seen that the reaction (2) results in the formation of water that may bring about locally a dilution of electrolyte.

If the electrolyte is gelled by native starches, this water formation may result in the destruction of the gel through a bursting of the grains due to the dilution of the electrolyte. On the other hand, however, by use of gelled electrolyte in accordance with the invention, gelled by reticulated starches, the gelatinoid state is in no way altered by the formation of water.

An electrolyte gelled in accordance with the invention can also be advantageously used by mixing with powdery zinc to constitute a negative electrode for an electrochemical generator.

The reticulated starches used may originate for instance from corn, potatoes, and may even constitute a mixture of different starch origins.

The invention also contemplates the use as gelling agents of a mixture of native starches and of reticulated starches, the latter being required to be present in the alkaline solution, e.g. potassium hydroxide in an amount exceeding that of the native starches. Favorable results were obtained with alkaline solutions whose gelling agents were constituted by mixtures in which the content of modified or reticulated starches was reduced to about 60% by weight, the balance being native starches.

It is of course understood that the invention is in no way limited to the embodiments described which were given by way of example only. In particular, without departing from the framework of the invention and scope of the appended claims, modifications of details, changed certain arrangements, or replacement certain means by equivalents may be effected.

What is claimed is:

1. Gelled alkaline electrolyte for electrochemical generators consisting of potassium hydroxide solution together with added gelling agent, said gelling agent consisting of mixtures of reticulated starches having a processing index of from 25–50 and native starches, and said processing index of said reticulated starches being ascertained from a mixture of 5 grams thereof with 100 cc of water at approximately 100°C. that will after a 24 hour rest period settle a volume of from 25 to 50 cc of said reticulated starches, said electrolyte viscosity being independent of the concentration of said potassium hydroxide therein.

2. Gelled alkaline electrolyte according to claim 1 wherein said solution has a normality below 11N.

3. Gelled alkaline electrolyte according to claim 1 wherein said gelling agent consists of mixture of native starches and of said modified or reticulated starches, the amount of the latter in said mixture exceeding that of the native starches.

4. Gelled electrolyte according to claim 3 wherein the content of said reticulated starches in said mixture exceeds about 60% by weight.

5. Electrochemical generator embodying a gelled alkaline electrolyte consisting of a potassium hydroxide solution containing a gelling agent, said gelling agent consisting of mixtures of reticulated starches and native starches, said reticulated starches having a processing index lying between 25 and 50 whose swelling factor is substantially constant irrespective of a normality between about 1N to about 11N of said potassium hydroxide solution.

6. Electrochemical generator according to claim 5 wherein said gelling agent consists of a mixture of said reticulated starches and said native starches, said reticulated starches being present in the amount of about 60% by weight in said mixture.

7. Electrochemical generator according to claim 5 wherein said reticulated starches are present in an amount ranging from 150 to 240 grams per liter.

8. Electrochemical generator according to claim 5 wherein the negative electrode is constituted by the said gelled electrolyte mixed with powdery zinc.

9. Electrochemical generator according to claim 5 wherein said gelling agent also includes native starches in a smaller amount than the said reticulated starches.

10. Electrochemical generator according to claim 5 including a negative active material and wherein said negative active material consists of zinc powder together with said gelled electrolyte, said electrolyte consisting of potassium hydroxide solution with added gelling agent, said gelling agent comprising said reticulated starches.

11. Electrochemical generator according to claim 10 wherein said potassium hydroxide solution has a normality below 11N.

12. Gelled alkaline electrolyte for electrochemical generators consisting of a potassium hydroxide solution together with added gelling agent, said gelling agent consisting of mixtures of reticulated starches having a processing index of from 25 – 50 and native starches, the amount in said mixture of said reticulated starches exceeding the amount of said native starches therein, and said processing index of said reticulated starches being ascertained from a mixture of 5 grams thereof with 100 cc of water at approximately 100°C. that will after a 24 hour rest period settle a volume of from 25 to 50 cc of said reticulated starches, said electrolyte viscosity being independent of the concentration of said potassium hydroxide therein.

13. Electrochemical generator embodying a gelled alkaline electrolyte consisting of a potassium hydroxide solution containing a gelling agent, said gelling agent consisting of mixtures of reticulated starches and native starches wherein the amount of reticulated starches exceeds the amount of native starches in said mixture, said reticulated starches having a processing index lying between 25 and 50 whose swelling factor is substantially constant irrespective of a normality between about 1N and about 11N of said potassium hydroxide solution.

* * * * *